US010866851B2

(12) United States Patent
Basiri et al.

(10) Patent No.: US 10,866,851 B2
(45) Date of Patent: Dec. 15, 2020

(54) DETERMINING THE FAILURE RESILIENCY OF A SERVICE IN A DISTRIBUTED COMPUTING SYSTEM

(71) Applicant: NETFLIX, INC., Los Gatos, CA (US)

(72) Inventors: Ali Basiri, Santa Clara, CA (US); Aaron Blohowiak, Belmont, CA (US); Lorin Hochstein, San Jose, CA (US); Casey Rosenthal, Campbell, CA (US)

(73) Assignee: NETFLIX, INC., Los Gatos, CA (US)

( * ) Notice: Subject to any disclaimer, the term of this patent is extended or adjusted under 35 U.S.C. 154(b) by 704 days.

(21) Appl. No.: 15/393,183

(22) Filed: Dec. 28, 2016

(65) Prior Publication Data

US 2018/0089011 A1 Mar. 29, 2018

Related U.S. Application Data

(60) Provisional application No. 62/401,095, filed on Sep. 28, 2016.

(51) Int. Cl.
*G06F 11/24* (2006.01)
*G06F 11/07* (2006.01)
(Continued)

(52) U.S. Cl.
CPC .......... *G06F 11/079* (2013.01); *G06F 9/5077* (2013.01); *G06F 11/008* (2013.01);
(Continued)

(58) Field of Classification Search
CPC ... G06F 2009/45562; G06F 2009/4557; G06F 2009/455575; G06F 11/008; G06F 11/24;
(Continued)

(56) References Cited

U.S. PATENT DOCUMENTS 6,567,857 B1 * 5/2003 Gupta ................. H04L 67/2804
370/235
8,001,422 B1 * 8/2011 Sun ....................... G06F 11/263
714/25

(Continued)

OTHER PUBLICATIONS

S. Newman, Building microservices. O'Reilly Media, 2015.

(Continued)

*Primary Examiner* — Joseph O Schell
(74) *Attorney, Agent, or Firm* — Artegis Law Group, LLP

(57) ABSTRACT

One embodiment of the present invention sets forth a technique for testing microservices in distributed computing systems. The technique includes routing a first traffic sample associated with request traffic from one or more client devices to a first instance of a first service implemented in a distributed computing system, wherein the first instance generates a first plurality of request responses in response to a first plurality of data requests included in the first traffic sample and transmits the first plurality of request responses to a second service included in the sequence of services, and routing a second traffic sample associated with the request traffic to a second instance of the first service, wherein the second instance generates a second plurality of request responses in response to a second plurality of data requests included in the second traffic sample and transmits the second plurality of request responses to the second service.

20 Claims, 11 Drawing Sheets

(51) Int. Cl.
*G06F 9/50* (2006.01)
*G06F 11/30* (2006.01)
*G06F 11/36* (2006.01)
*G06F 11/00* (2006.01)
*H04L 12/26* (2006.01)
*H04L 29/08* (2006.01)

(52) U.S. Cl.
CPC ...... *G06F 11/0709* (2013.01); *G06F 11/0751* (2013.01); *G06F 11/3006* (2013.01); *G06F 11/3672* (2013.01); *H04L 43/50* (2013.01); *H04L 67/025* (2013.01); *H04L 67/10* (2013.01); *G06F 11/24* (2013.01); *G06F 11/3688* (2013.01); *G06F 11/3692* (2013.01); *H04L 43/0823* (2013.01)

(58) Field of Classification Search
CPC ............. G06F 11/3672; G06F 11/3688; G06F 11/3692; H04L 43/00; H04L 43/16; H04L 43/50; H04L 43/08; H04L 43/0823; H04L 43/0829; H04L 43/0847; H04L 43/0835; H04L 43/0841
See application file for complete search history.

(56) References Cited

U.S. PATENT DOCUMENTS

| | | | | |
|---|---|---|---|---|
| 8,281,187 | B1* | 10/2012 | Desai | H04L 43/50 714/25 |
| 9,542,301 | B1* | 1/2017 | Griesemer | G06F 11/3644 |
| 9,935,818 | B1* | 4/2018 | Kim | H04L 41/0645 |
| 9,979,674 | B1* | 5/2018 | Kumar | H04L 43/0876 |
| 2002/0198985 | A1* | 12/2002 | Fraenkel | G06F 11/3409 709/224 |
| 2004/0088605 | A1* | 5/2004 | Nakamoto | H04L 43/50 714/43 |
| 2007/0213966 | A1* | 9/2007 | Noble | H04L 41/145 703/13 |
| 2009/0300423 | A1* | 12/2009 | Ferris | G06F 11/36 714/38.1 |
| 2013/0275518 | A1* | 10/2013 | Tseitlin | G06F 11/36 709/206 |
| 2013/0343388 | A1* | 12/2013 | Stroud | H04L 47/00 370/392 |
| 2014/0172960 | A1* | 6/2014 | Lee | H04L 67/10 709/203 |
| 2017/0012814 | A1* | 1/2017 | Zaidi | H04L 41/5009 |
| 2017/0242784 | A1* | 8/2017 | Heorhiadi | H04L 41/5038 |
| 2018/0167285 | A1* | 6/2018 | Constantinescu | H04L 67/34 |

OTHER PUBLICATIONS

J. Hodges, "Notes on distributed systems for young bloods," https://www.somethingsimilar.com/2013/01/14/notes-on-distributed-systems-for-young-bloods/, Jan. 14 2013, something Similar blog.

A. Basiri, N. Behnam, R. de Rooij, L. Hochstein, L. Kosewski, J. Reynolds, and C. Rosenthal, "Chaos engineering," IEEE Software, vol. 33, No. 3, pp. 35-41, May 2016.

B. Schmaus, C. Carey, N. Joshi, N. Mahilani, and S. Podila, "Stream-processing with Mantis," http://techblog.netflix.com/2016/03/stream-processing-with-mantis.html, Mar. 14, 2016, Netflix Tech Blog.

B. Schmaus, "Deploying the Netflix API," http://techblog.netflix.com/2013/08/deploying-netflix-api.html, Aug. 14, 2013, Netflix Tech Blog.

B. Harrington and R. Rapoport, "Introducing Atlas: Netflix's primary telemetry platform," http://techblog.netflix.com/2014/12/introducing-atlas-netflixs-primary.html, Dec. 12, 2014, Netflix Tech Blog.

B. Christensen, "Introducing Hystrix for resilience engineering," http://techblog.netflix.com/2012/11/hystrix.html, Nov. 26, 2012, Netflix Tech Blog.

P. Fisher-Ogden, C. Sanden, and C. Rioux, "SPS: the pulse of Netflix streaming," http://techblog.netflix.com/2015/02/sps-pulse-of-netflix-streaming.html, Feb. 2, 2015, Netflix Tech Blog.

D. Yuan, Y. Luo, X. Zhuang, G. R. Rodrigues, X. Zhao, Y. Zhang, P. U. Jain, and M. Stumm, "Simple testing can prevent most critical failures: An analysis of production failures in distributed dataintensive systems," Proceedings of the 11th USENIX Symposium on Operating Systems Design and Implementation (OSDI '14), 2014.

M. Cohen and M. Hawthorne, "Announcing Zuul: Edge service in the cloud," http://techblog.netflix.com/2013/06/announcing-zuul-edge-service-in-cloud.html, Jun. 12, 2013, Netflix Tech Blog.

B. Christensen, "Optimizing the Netflix API," http://techblog.netflix.com/2013/01/optimizing-netflix-api.html, Jan. 15, 2013, Netflix Tech Blog.

K. Andrus, N. Gopalani, and B. Schmaus, "FIT: Failure injection testing," http://techblog.netflix.com/2014/10/fit-failure-injection-testing.html, Oct. 23, 2014, Netflix Tech Biog.

A. Glover, "Global continuous delivery with Spinnaker," http://techblog.netflix.com/2015/11/global-continuous-delivery-with.html, Nov. 16, 2015, Netflix Tech Blog.

K. Ranganathan, "Netflix shares cloud load balancing and failover tool: Eureka!" http://techblog.netflix.com/2012/09/eureka. html, Sep. 4, 2012, Netflix Tech Blog.

A. Wang and S. Tonse, "Announcing Archaius: Dynamic properties in the cloud," http://techblog.netflix.com/2012/06/annoucing-archaius-dynamic-properties.html, Jun. 18, 2012, Netflix Tech Blog.

"Announcing Ribbon: Tying the Netflix midtier services together," http://techblog.netflix.com/2013/01/announcing-ribbon-tying-netflix-mid.html, Jan. 28, 2013, Netflix Tech Blog.

International Search Report and Written Opinion for International Application No. PCT/US2017/053841, dated Dec. 19, 2017, 17 pages.

Sangroya et al., "Benchmarking Dependability of MapReduce Systems", 31st International Symposium on Reliable Distributed Systems, IEEE, Oct. 8, 2012, 10 pages.

Heorhiadi et al., "Gremlin: Systematic Resilience Testing of Microservices", DOI 10.1109/ICDCS.2016.11, Proceedings of The International Conference on Distributed Computing Systems, IEEE Computer Society, Jun. 27, 2016, pp. 57-66.

* cited by examiner

US 10,866,851 B2

DETERMINING THE FAILURE RESILIENCY OF A SERVICE IN A DISTRIBUTED COMPUTING SYSTEM

CROSS-REFERENCE TO RELATED APPLICATIONS

This application claims the priority benefit of the U.S. Provisional Patent Application having Ser. No. 62/401,095 and filed on Sep. 28, 2016. The subject matter of this related application is hereby incorporated herein by reference.

BACKGROUND OF THE INVENTION

Field of the Invention

The present invention relates generally to computer science and, more specifically, to an approach for detecting service vulnerabilities in a distributed computing system.

Description of the Related Art

Distributed computing systems are now commonly employed to provide software solutions in highly-scaled computing environments. In such systems, software solutions may be composed of a substantial number of different services that are designed to work together to provide the functionality of the overall system, such as a content streaming service. Thus, rather than writing a single stand-alone application that provides an online content streaming service, such a service could be provided by tens or even hundreds of smaller software services, or "microservices," each designed to perform a specific set of tasks. Again, when aggregated, those microservices are designed to to provide the overall functionality of the content streaming service.

The application of microservices in the context of highly-scaled computing environments has multiple advantages. For instance, compartmentalizing the development of the over-arching software solution is greatly facilitated, since each stand-alone service can be assigned to a small group of programmers for implementation. In addition, the modularity of the software solution is enhanced, since individual microservices can be easily removed and replaced with updated microservices that perform the same task. A further advantage is that such modularized design allows the software solution to be easily distributed and redistributed over multiple different compute nodes (either physical or virtual) depending on how the different services are positioned and configured.

Despite the above advantages, one drawback to using microservices to implement a software solution is that troubleshooting the overall software solution is generally made more difficult. In particular, pinpointing the root cause of a problem in a heavily distributed software solution can be problematic. For example, in a software solution made up of several hundred interconnected microservices, a problem occurring in one of the services may adversely affect the performance and/or quality of several other microservices, which in turn may adversely affect the performance and/or quality of still other microservices. With multiple microservices manifesting adverse performance or quality issues simultaneously, software developers may have difficulty pinpointing which of the malfunctioning services is the actual cause of the problem. Furthermore, in an environment in which a number of interrelated microservices are executing and in which the performance and/or quality of a particular microservice can be influenced by both the workload of that particular microservice as well as the performance, quality and/or workload of other microservices, detecting subtle differences in the performance or quality of the particular microservice can be extremely difficult if not impossible.

As the foregoing illustrates, what is needed in the art are more effective approaches to testing microservices in a distributed computing environment.

SUMMARY OF THE INVENTION

One embodiment of the present invention sets forth a technique for testing microservices in a distributed computing system. The technique includes routing a first traffic sample associated with request traffic from one or more client devices to a first instance of a first service included in a sequence of services implemented in a distributed computing system, wherein the first instance generates a first plurality of request responses in response to a first plurality of data requests included in the first traffic sample and transmits the first plurality of request responses to a second service included in the sequence of services, and routing a second traffic sample associated with the request traffic to a second instance of the first service, wherein the second instance generates a second plurality of request responses in response to a second plurality of data requests included in the second traffic sample and transmits the second plurality of request responses to the second service. The technique further includes computing a first success rate for the distributed computing system based on the first plurality of data requests and the first plurality of request responses, computing a second success rate for the distributed computing system based on the second plurality of data requests and the second plurality of request responses, and determining a failure resiliency status of the first service based on the first success rate and the second success rate.

At least one advantage of the disclosed techniques is that interactions between the many individual microservices in a distributed computing system can be tested in a controlled and systematic way, thereby reducing the systemic uncertainty in the distributed computing system. A further advantage is that multiple tests can be performed in parallel in the distributed computing system separately from one another, without affecting the results of other tests, which increases the performance and flexibility of different test paradigms.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

System Overview

Figure 1:
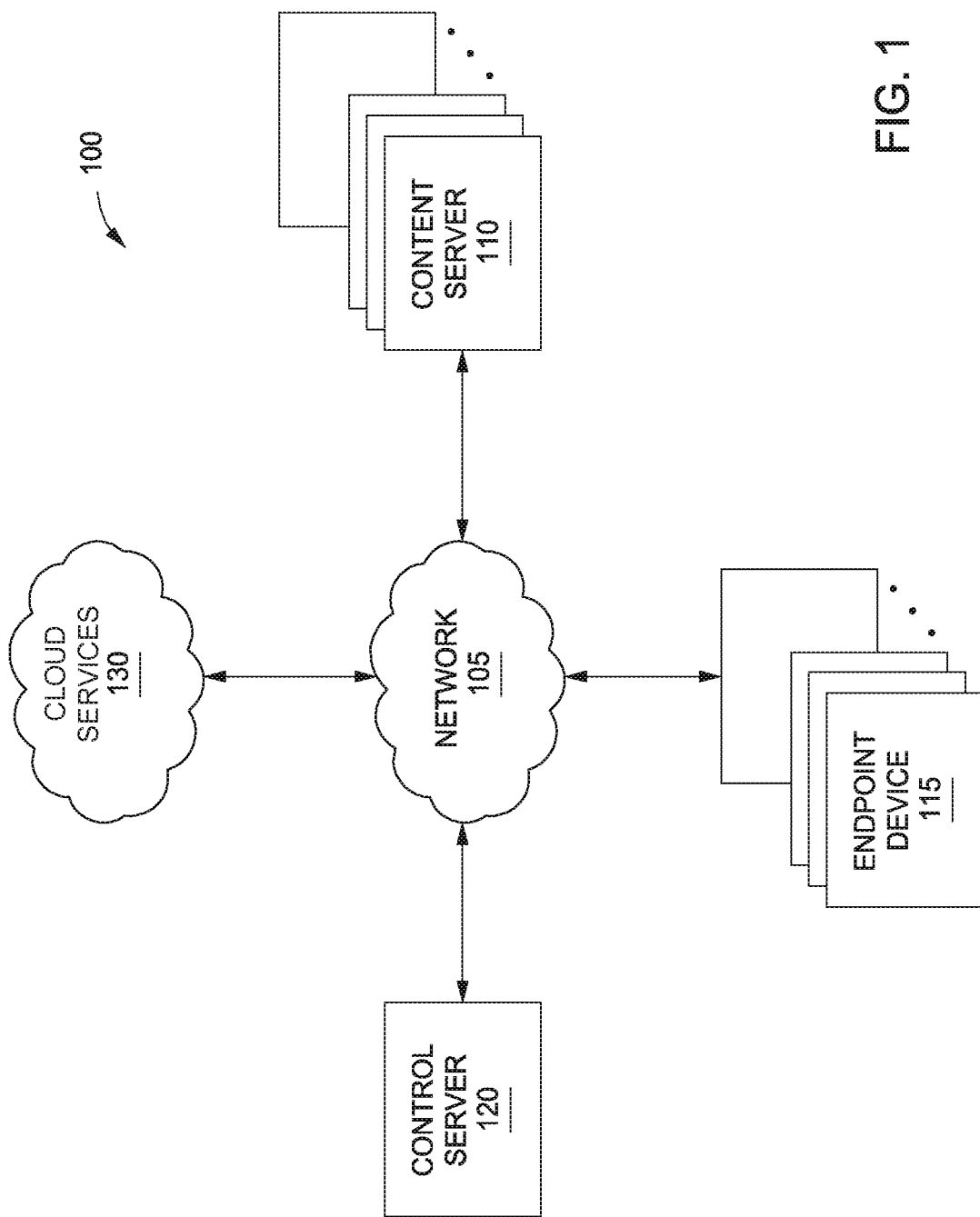
FIG. 1 illustrates a network infrastructure configured to implement one or more aspects of the present invention.

FIG. 1 illustrates a network infrastructure 100 used to distribute content to content servers 110 and endpoint devices 115, according to various embodiments of the invention. As shown, the network infrastructure 100 includes content servers 110, control server 120, and endpoint devices 115, each of which are connected via a communications network 105.

Each endpoint device 115 communicates with one or more content servers 110 (also referred to as "caches" or "nodes") via the network 105 to download content, such as textual data, graphical data, audio data, video data, and other types of data. The downloadable content, also referred to herein as a "file," is then presented to a user of one or more endpoint devices 115. In various embodiments, the endpoint devices 115 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 110 may include a web-server, database, and server application 217 configured to communicate with the control server 120 to determine the location and availability of various files that are tracked and managed by the control server 120. Each content server 110 may further communicate with cloud services 130 and one or more other content servers 110 in order "fill" each content server 110 with copies of various files. In addition, content servers 110 may respond to requests for files received from endpoint devices 115. The files may then be distributed from the content server 110 or via a broader content distribution network. In some embodiments, the content servers 110 enable users to authenticate (e.g., using a username and password) in order to access files stored on the content servers 110. Although only a single control server 120 is shown in FIG. 1, in various embodiments multiple control servers 120 may be implemented to track and manage files.

In various embodiments, the cloud services 130 may include an online storage service (e.g., Amazon® Simple Storage Service, Google® Cloud Storage, etc.) in which a catalog of files, including thousands or millions of files, is stored and accessed in order to fill the content servers 110. Cloud services 130 also may provide compute or other processing services. Although only a single cloud services 130 is shown in FIG. 1, in various embodiments multiple cloud services 130 may be implemented.

Figure 2:
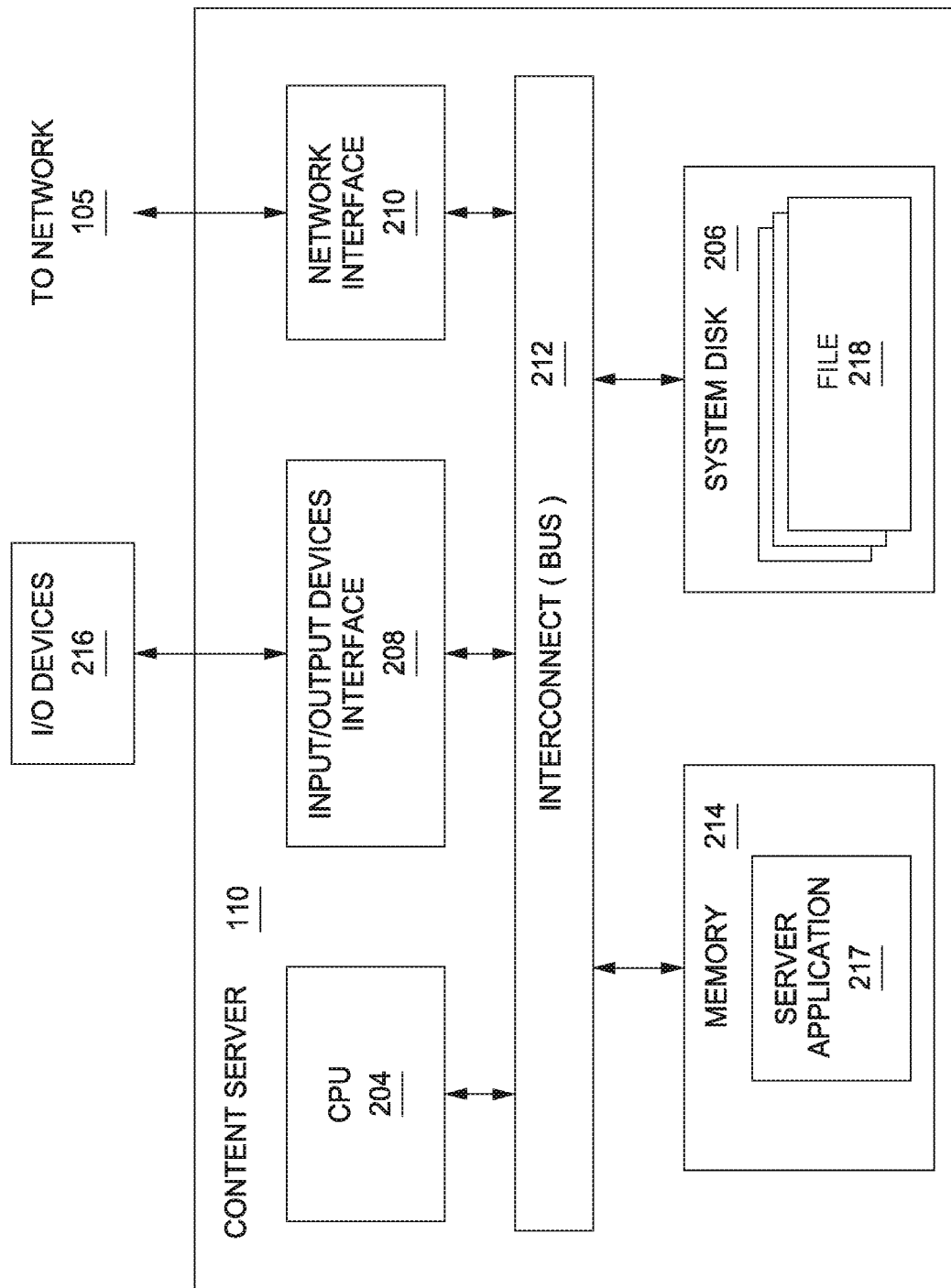
FIG. 2 is a block diagram of a content server that may be implemented in conjunction with the network infrastructure of FIG. 1, according to various embodiments of the present invention.

FIG. 2 is a block diagram of a content server 110 that may be implemented in conjunction with the network infrastructure 100 of FIG. 1, according to various embodiments of the present invention. As shown, the content server 110 includes, without limitation, a central processing unit (CPU) 204, a system disk 206, an input/output (I/O) devices interface 208, a network interface 210, an interconnect 212, and a system memory 214.

The CPU 204 is configured to retrieve and execute programming instructions, such as server application 217, stored in the system memory 214. Similarly, the CPU 204 is configured to store application data (e.g., software libraries) and retrieve application data from the system memory 214. The interconnect 212 is configured to facilitate transmission of data, such as programming instructions and application data, between the CPU 204, the system disk 206, I/O devices interface 208, the network interface 210, and the system memory 214. The I/O devices interface 208 is configured to receive input data from I/O devices 216 and transmit the input data to the CPU 204 via the interconnect 212. For example, I/O devices 216 may include one or more buttons, a keyboard, a mouse, and/or other input devices. The I/O devices interface 208 is further configured to receive output data from the CPU 204 via the interconnect 212 and transmit the output data to the I/O devices 216.

The system disk 206 may include one or more hard disk drives, solid state storage devices, or similar storage devices. The system disk 206 is configured to store non-volatile data such as files 218 (e.g., audio files, video files, subtitles, application files, software libraries, etc.). The files 218 can then be retrieved by one or more endpoint devices 115 via the network 105. In some embodiments, the network interface 210 is configured to operate in compliance with the Ethernet standard.

The system memory 214 includes a server application 217 configured to service requests for files 218 received from endpoint device 115 and other content servers 110. When the server application 217 receives a request for a file 218, the server application 217 retrieves the corresponding file 218 from the system disk 206 and transmits the file 218 to an endpoint device 115 or a content server 110 via the network 105. Files 218 include a plurality of digital visual content items, such as videos and still images. In addition, files 218 may include metadata associated with such visual content items, user/subscriber data, etc. Files 218 that include visual content item metadata and/or user/subscriber data may be employed to facilitate the overall functionality of network infrastructure 100. In alternative embodiments, some or all of files 218 may instead be stored in a control server 120, or in any other technically feasible location within network infrastructure 100.

Figure 3:
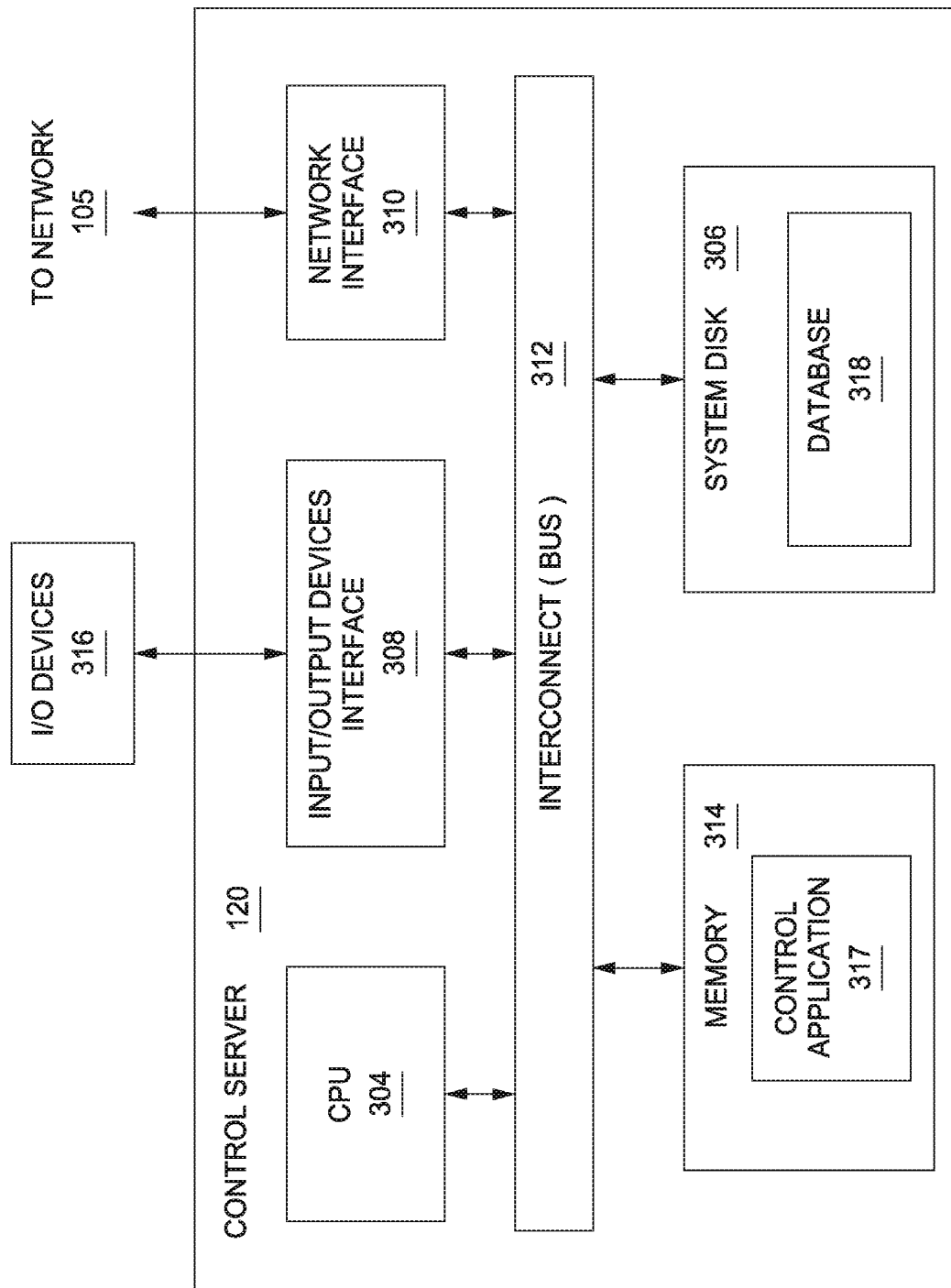
FIG. 3 is a block diagram of a control server that may be implemented in conjunction with the network infrastructure of FIG. 1, according to various embodiments of the present invention.

FIG. 3 is a block diagram of a control server 120 that may be implemented in conjunction with the network infrastructure 100 of FIG. 1, according to various embodiments of the present invention. As shown, the control server 120 includes, without limitation, a central processing unit (CPU) 304, a system disk 306, an input/output (I/O) devices interface 308, a network interface 310, an interconnect 312, and a system memory 314.

The CPU 304 is configured to retrieve and execute programming instructions, such as control application 317, stored in the system memory 314. Similarly, the CPU 304 is configured to store application data (e.g., software libraries) and retrieve application data from the system memory 314 and a database 318 stored in the system disk 306. The interconnect 312 is configured to facilitate transmission of data between the CPU 304, the system disk 306, I/O devices interface 308, the network interface 310, and the system memory 314. The I/O devices interface 308 is configured to transmit input data and output data between the I/O devices 316 and the CPU 304 via the interconnect 312. The system disk 306 may include one or more hard disk drives, solid state storage devices, and the like. The system disk 206 is configured to store a database 318 of information associated with the content servers 110, the cloud services 130, and the files 218.

The system memory 314 includes a control application 317 configured to access information stored in the database 318 and process the information to determine the manner in which specific files 218 will be replicated across content servers 110 included in the network infrastructure 100. The control application 317 may further be configured to receive and analyze performance characteristics associated with one or more of the content servers 110 and/or endpoint devices 115. As noted above, in some embodiments, metadata associated with such visual content items, and/or user/subscriber data may be stored in database 318 rather than in files 218 stored in content servers 110.

Figure 4:
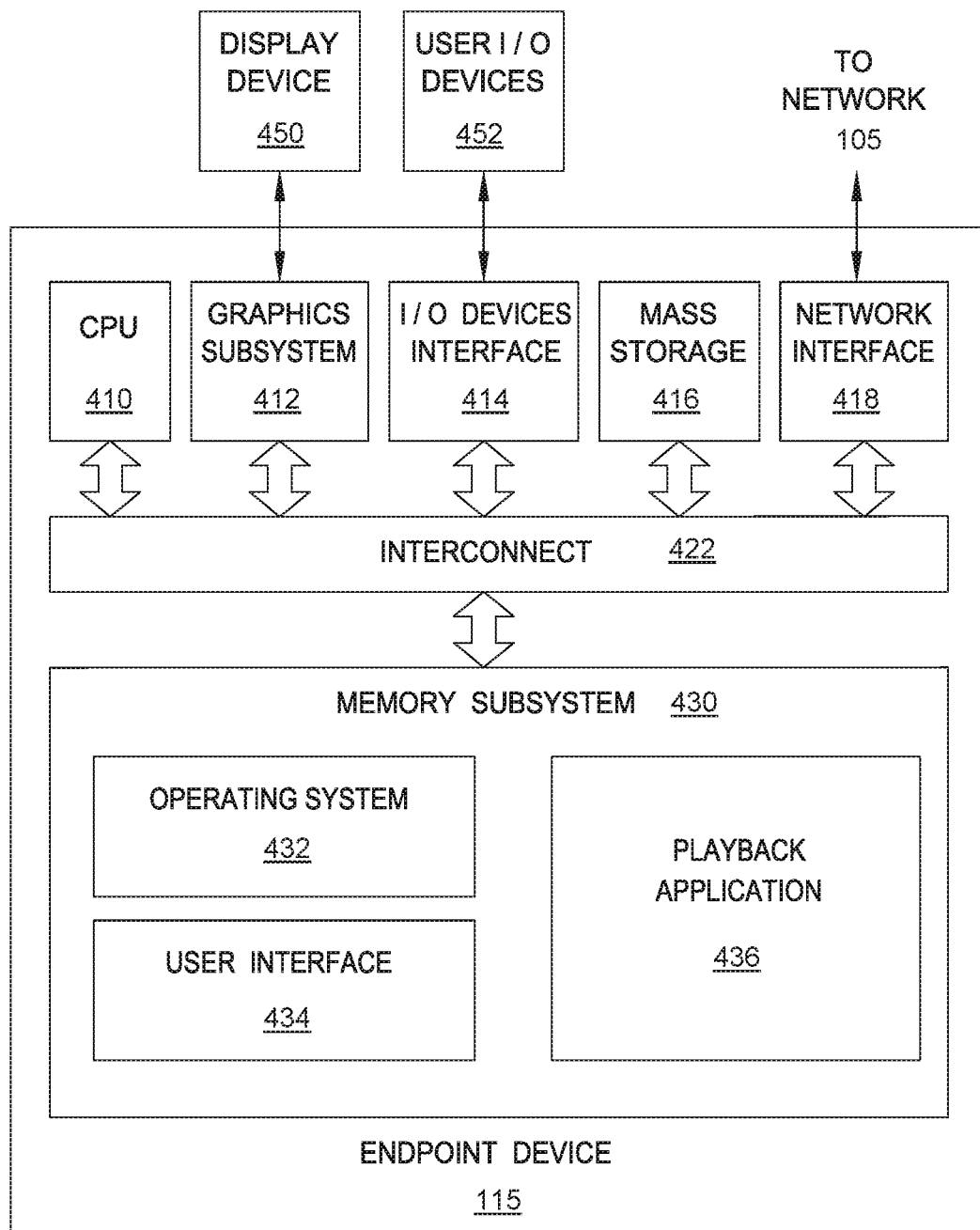
FIG. 4 is a block diagram of an endpoint device that may be implemented in conjunction with the network infrastructure of FIG. 1, according to various embodiments of the present invention.

FIG. 4 is a block diagram of an endpoint device 115 that may be implemented in conjunction with the network infrastructure 100 of FIG. 1, according to various embodiments of the present invention. As shown, the endpoint device 115 may include, without limitation, a CPU 410, a graphics subsystem 412, an I/O device interface 414, a mass storage unit 416, a network interface 418, an interconnect 422, and a memory subsystem 430.

In some embodiments, the CPU 410 is configured to retrieve and execute programming instructions stored in the memory subsystem 430. Similarly, the CPU 410 is configured to store and retrieve application data (e.g., software libraries) residing in the memory subsystem 430. The interconnect 422 is configured to facilitate transmission of data, such as programming instructions and application data, between the CPU 410, graphics subsystem 412, I/O devices interface 414, mass storage 416, network interface 418, and memory subsystem 430.

In some embodiments, the graphics subsystem 412 is configured to generate frames of video data and transmit the frames of video data to display device 450. In some embodiments, the graphics subsystem 412 may be integrated into an integrated circuit, along with the CPU 410. The display device 450 may comprise any technically feasible means for generating an image for display. For example, the display device 450 may be fabricated using liquid crystal display (LCD) technology, cathode-ray technology, and light-emitting diode (LED) display technology. An input/output (I/O) device interface 414 is configured to receive input data from user I/O devices 452 and transmit the input data to the CPU 410 via the interconnect 422. For example, user I/O devices 452 may comprise one of more buttons, a keyboard, and a mouse or other pointing device. The I/O device interface 414 also includes an audio output unit configured to generate an electrical audio output signal. User I/O devices 452 includes a speaker configured to generate an acoustic output in response to the electrical audio output signal. In alternative embodiments, the display device 450 may include the speaker. Examples of suitable devices known in the art that can display video frames and generate an acoustic output include televisions, smartphones, smartwatches, electronic tablets, and the like.

A mass storage unit 416, such as a hard disk drive or flash memory storage drive, is configured to store non-volatile data. A network interface 418 is configured to transmit and receive packets of data via the network 105. In some embodiments, the network interface 418 is configured to communicate using the well-known Ethernet standard. The network interface 418 is coupled to the CPU 410 via the interconnect 422.

In some embodiments, the memory subsystem 430 includes programming instructions and application data that comprise an operating system 432, a user interface 434, and a playback application 436. The operating system 432 performs system management functions such as managing hardware devices including the network interface 418, mass storage unit 416, I/O device interface 414, and graphics subsystem 412. The operating system 432 also provides process and memory management models for the user interface 434 and the playback application 436. The user interface 434, such as a window and object metaphor, provides a mechanism for user interaction with endpoint device 108. Persons skilled in the art will recognize the various operating systems and user interfaces that are well-known in the art and suitable for incorporation into the endpoint device 108.

In some embodiments, the playback application 436 is configured to request and receive content from the content server 105 via the network interface 418. Further, the playback application 436 is configured to interpret the content and present the content via display device 450 and/or user I/O devices 452.

Request Path in a Distributed Computing System

Figure 5:
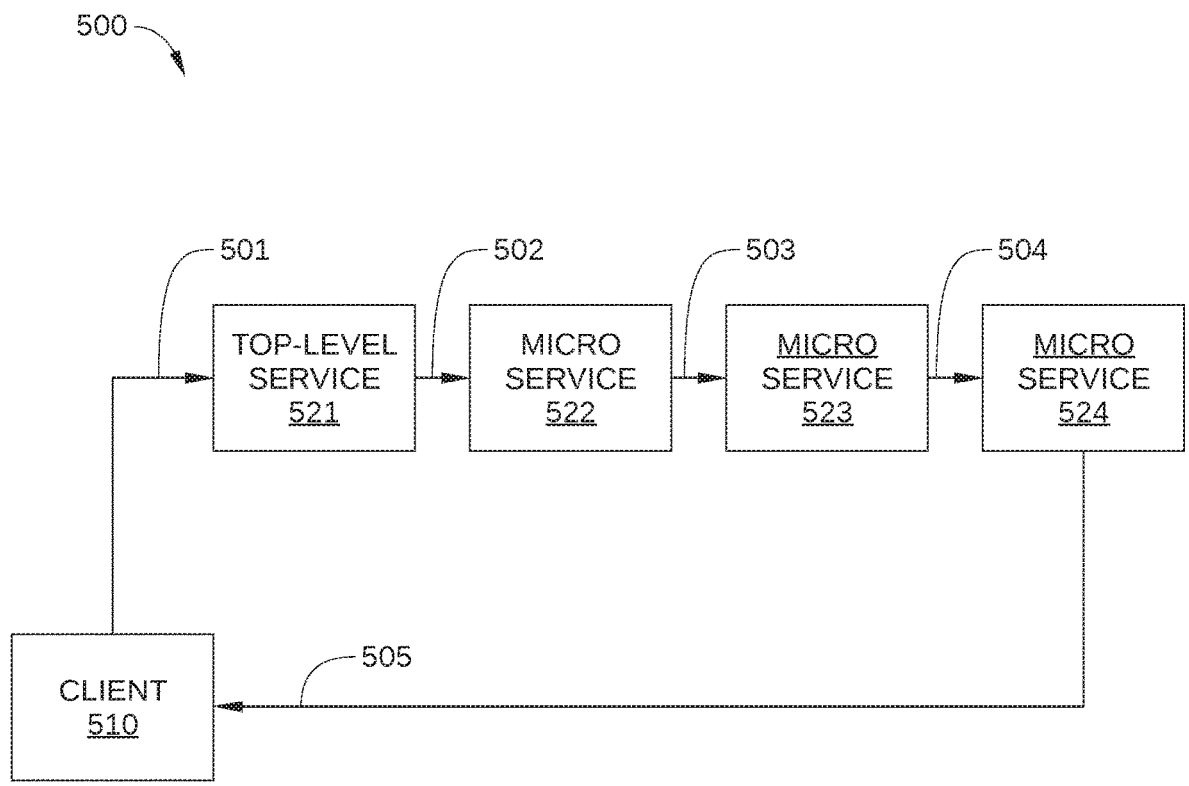
FIG. 5 schematically illustrates a request path included in the network infrastructure of FIG. 1, according to various embodiments of the invention.

FIG. 5 schematically illustrates a request path 500 included in network infrastructure 100, according to various embodiments of the invention. Request path 500 represents a path traversed by various requests when a data request 501 is received from a client 510. Request path 500 passes through multiple microservices that are employed in response to a data request from client 510. Thus, in the embodiment illustrated in FIG. 5, request path 500 traverses a top-level service 521 and multiple downstream microservices 522, 523, and 524. Client 510 may be implemented as a software application running on an endpoint device 115 of FIG. 1. Top-level service 521 and multiple microservices 522, 523, and 524 are services that may each be instantiated in one or more of content servers 110, control servers 120, and/or cloud services 130 of FIG. 1. Thus, request path 500 represents communications between an endpoint 115 and content servers 110, control servers 120, and/or cloud services 130 when client 510 makes a request on content servers 110, control servers 120, and/or cloud services 130.

For simplicity of description, in the embodiment illustrated in FIG. 5, request path 500 is depicted as a linear process. That is, the input of each microservice in request path 500 is the output of a single upstream microservice, and each of microservices 522, 523, and 524 is traversed sequentially by a request from client 510. In practice, when client 510 makes a request within network infrastructure 100 via data request 501, multiple data requests may fan out from one or more of microservices 522, 523, and 524 to other microservices. In addition, the output of a downstream microservice may be employed as an input to an upstream microservice.

Top-level service 521 may be configured as a homepage or other subscriber-facing web service. In some embodiments, top-level service 521 is implemented as a reverse proxy that serves as a front door to network infrastructure 100. In some embodiments, top-level service 521 is configured to tag or otherwise indicate a selected portion of received data requests (from client 510 and other clients) for diversion to a control server and to a failure injection server, as described below in conjunction with FIG. 7. For example, in some embodiments, top-level service 521 employs a consistent hashing algorithm to select a small percentage of received data requests from the total number of data requests received. Top-level service 521 then modifies the selected data requests to indicate that the request path associated with each selected data request is to be diverted to the control server or the failure injection server. For example, in some embodiments, top-level service 521 modifies a header of the selected data requests to include an Internet Protocol (IP) address or a virtual IP (VIP) address of either the control server or the failure injection server. In such embodiments, request responses generated by microservices 522, 523, and 524 in response to the selected data requests also include the header modified to include the IP or VIP address of the control server or failure injection server. One embodiment of such a header is described below in conjunction with FIG. 6.

Each of microservices 522, 523, and 524 may be a critical or non-critical service that enables or facilitates the operation of network infrastructure 100. To that end, each of microservices 522, 523, and 524 is configured to receive requests from a client, perform the requested service, such as retrieving specific data from a database, and transmit such data to the client an/or generate an additional request for a different microservice, as appropriate. In embodiments in which network infrastructure 100 is a content streaming service, examples of services performed by microservices 522, 523, or 524 include: determining customer settings based on metadata included in data request 501; determining what content is eligible for streaming to a device associated with client 510, and providing visual content to client 510 in response to specific user requests, such as galleries of images that represent streamable content, search results, account settings, and the like.

In operation, data request 501, which is initiated by client 510, is received by top-level service 521, and, after the request traverses the appropriate microservices in response path 500, a request response 505 is transmitted to client 510 that provides the data requested by client 510. Specifically, data request 501 is received by top-level service 521, which processes data request 501 and, in response, transmits a request response 502 to downstream microservice 522. Likewise, microservice 522 receives and processes request response 502 and transmits a request response 503 to downstream microservice 522; microservice 523 receives and processes request response 503 and transmits a request response 504 to downstream microservice 524; and microservice 524 receives request response 504 and transmits request response 505 to client 510. One format for data request 501, request response 502, request response 503, request response 504, and request response 505 is illustrated in FIG. 6.

Figure 6:
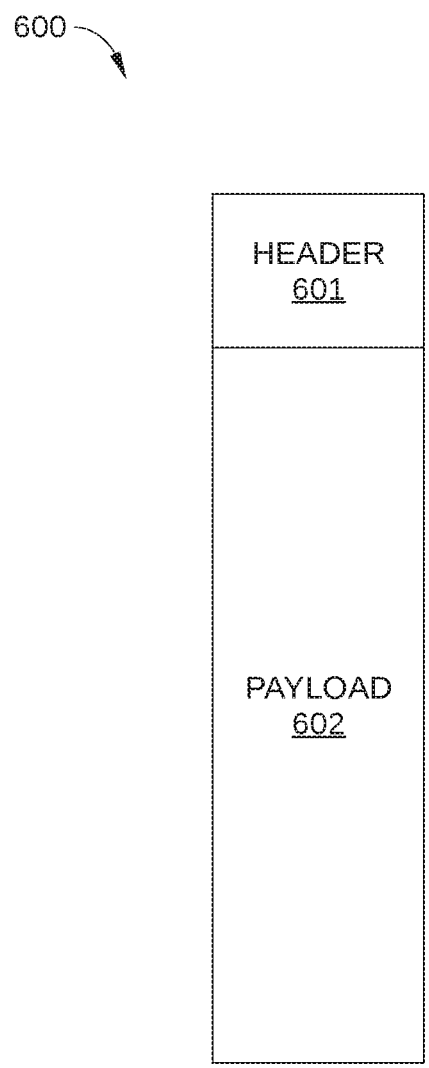
FIG. 6 is a schematic illustration of a data packet that can be implemented in the request path of FIG. 5 when testing a microservice, according to various embodiments of the present invention.

FIG. 6 is a schematic illustration of a data packet 600 that can be implemented in request path 500 when testing a microservice, according to various embodiments of the present invention. Data packet 600 depicts one suitable configuration for request responses 501-504 and response request 505, although any other technically feasible configuration may also be employed. As shown, interprocess communication includes a header 601 and a payload 602.

Header 601 generally includes metadata sufficient to enable a request from client 510 in FIG. 5 to traverse request path 500 and to enable request response 505 to be returned to client 510. For example, header 610 may include an IP address associated with client 510 as well as an IP address of a destination microservice for data packet 600. As such, header 601 may include metadata provided by client 510 and/or by microservices 522, 523, or 524 as a particular request, which is manifested as a series of request responses 501-505, traverses request path 500. Thus, header 601 may include metadata and/or other identifiers provided by one or more of microservices 522, 523, or 524, and/or by top-level service 521.

Payload 602 includes data provided by client 510 to enable a request to be completed by microservices 522, 523, and 524. For example, payload 602 may include user data, endpoint device data, and the like, associated with the endpoint device 115 on which client 510 is running. Alternatively or additionally, payload 602 may include data provided by one or more of microservices 522, 523, and 524. For example, payload 602 may include visual content that has been requested by client 510 and retrieved from a suitable database by a microservice in request path 500, such as user account settings, a gallery of images associated with previously viewed content, etc.

In some embodiments, top-level service 521 and microservices 522, 523, and 524 are configured to communicate via remote procedure call (RPC) while in other embodiments, any other suitable interprocess communication protocol may be employed between top-level service 521 and microservices 522, 523, and 524. RPC is a communication protocol based on the client-server model that a program, service, or microservice can use to request a service from a program located in another computer on a network. Thus, the requesting program is a client, the service-providing program is the server, and interprocess communications similar to data packet 600 in FIG. 6 may be employed to facilitate client-server communications. Like a regular or local procedure call, an RPC is typically a synchronous operation that requires the requesting program to be suspended until the results of the remote procedure are returned. As a result, when the service-providing program has some sort of failure, the requesting program or microservice can also be affected and suffer a fault, even though the requesting program is operating correctly. Similarly, microservices or other programs downstream of the faulting service-providing program can also be affected and suffer a fault, even though operating correctly.

In light of the above, for robust operation of network infrastructure 100, microservices included therein are typically configured to implement fallback behavior when making RPC calls against non-critical services. If such fallback behavior is not implemented correctly, a problem in a non-critical service can lead to more serious problems, such as an outage of service in network infrastructure 100. For example, microservice 522 may send a message to microservice 523, such as request response 503, that causes microservice 523 to fetch specific user data, such as a gallery of images of recently viewed video content. If microservice 523 is unable to access the appropriate database within network infrastructure 100 to retrieve such user-specific data, no visual content can be provided to client 510 for display via request response 505. As a result, a blank screen or a screen showing non-applicable information may be presented to the user by client 510, thereby causing a poor user experience. However, if microservice 523 is configured to implement appropriate fallback procedures, such as returning an older gallery that is present in a local cache or a gallery that is not personalized for the particular user, the above-described poor user experience can be avoided, even though microservice 523 was unable to successfully complete the instructions of request response 503.

According to various embodiments of the present invention, the functionality of microservices 522, 523, and 524 is configured to enable testing of a one of the other microservices included in request path 500. Specifically, a microservice that is a requesting program for a particular microservice is modified to divert a selected portion of request traffic from request path 500 to a failure injection server and a control server that each include the functionality of a particular microservice. To that end, each of microservices 522, 523, and 524 is configured with logic that routes half of the selected portion of request traffic to the control server and half of the selected portion of request traffic to the failure injection server, as described below.

Microservice Testing in a Distributed Computing System

As noted previously, in a software solution made up of several hundred interconnected services, pinpointing which of many malfunctioning services is the original cause of a problem can be problematic at best. According to various embodiments of the present invention, in a distributed computing system, such as network infrastructure 100, weaknesses with respect to a particular microservice are detected by observing the behavior of the distributed system during a controlled experiment. In the controlled experiment, a fraction of normal request traffic is diverted along a test path that includes two instances of the microservice of interest; failures are injected into the half of the diverted traffic that is directed to one instance and no failures are injected into the half of the diverted traffic that is directed to other instance. Overall behavior of the distributed system is then monitored with respect to the diverted traffic to quantify effects of the injected failures. In this way, the successful implementation of appropriate fallback behavior by microservices affected by the injected failures is confirmed. Thus, live traffic from a production environment can be used to uncover weaknesses in the performance or behavior of microservices downstream of the microservice being targeted, even though the effects of incorrect fallback behavior on the part of downstream microservices may be manifested at unpredictable points in the request path. One such embodiment is illustrated in FIG. 7.

Figure 7:
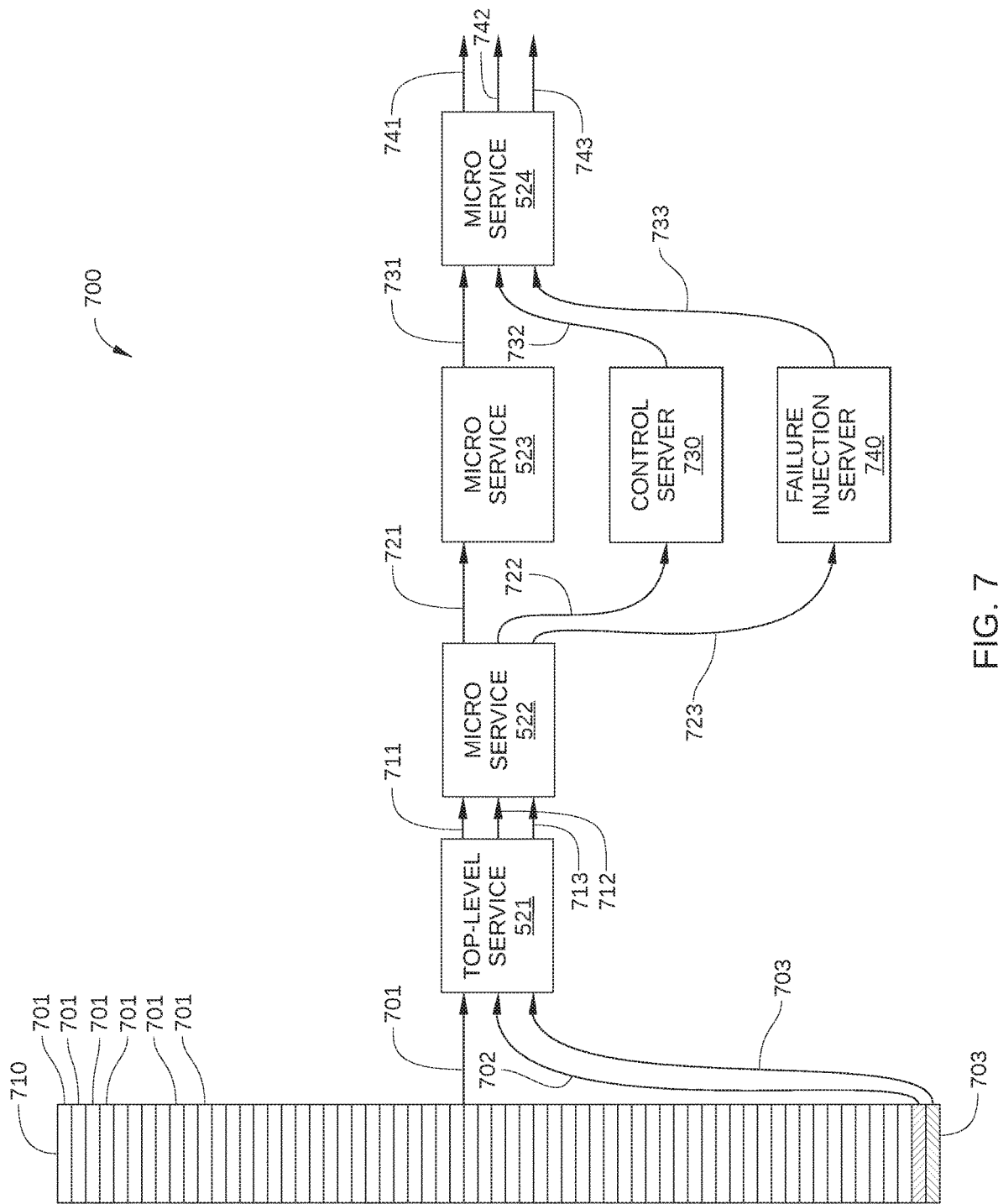
FIG. 7 schematically illustrates a test path implemented in conjunction with the request path of FIG. 5, according to various embodiments of the invention.

FIG. 7 schematically illustrates a test path 700 implemented in conjunction with request path 500, according to various embodiments of the invention. Test path 700 overlaps somewhat with request path 500 in FIG. 5, and therefore traverses some of the same microservices that are employed in response to each individual data request 701, such as top-level service 521 and multiple downstream microservices 522, 523, and 524. In addition, test path 700 includes a control server 730 and a failure injection server 740. When network infrastructure 100 is a content streaming service, request traffic 710 may include 100s or 1000s of individual data requests 701 per second, a small portion of which is represented by data request 702 and 703.

Test path 700 includes two sub-paths: one sub-path associated with data request 702 and one sub-path associated with data request 703. To wit, the sub-path associated with data request 702 includes request responses 712, 722, 732, and 742, while the sub-path associated with data request 703 includes request responses 713, 723, 733, and 743. It is noted that the request path that include data requests 701, and request responses 711, 721, 731, and 741 corresponds to request path 500 in FIG. 5.

Individual data requests 701, including data requests 702 and 703 (crosshatched), are directed to top-level service 521, where each individual data request 701 is generated by a different client (not shown). Therefore, a request response 711 is generated by top-level service 521 in response to receiving each individual data request 701, a request response 712 is generated by top-level service 521 in response to receiving data request 702, and a request response 713 is generated by top-level service 521 in response to receiving data request 703. Request response 712 includes a tag, metadata, or some other routing indicator that enables the routing of the data request associated with data request 702 through control server 730 rather than through microservice 523. Similarly, request response 713 includes a tag, metadata, or some other routing indicator that enables the routing of the data request associated with data request 703 through failure injection server 740 rather than through microservice 523. Request response 711, which represents the great majority of data traffic exiting top-level service 521, is directed to microservice 522.

As set forth above, microservice 522 is configured to receive requests from a client, perform a certain service, and transmit data and/or additional requests accordingly. Thus, in the embodiment of test path 700 illustrated in FIG. 7, microservice 522 receives request response 711, performs a service referenced in request response 711, and transmits request response 721 to microservice 523. In addition, microservice 522 receives request response 712, performs the service referenced therein, and transmits request response 721 to an appropriate microservice. Because request response 712 includes a routing indicator that the next step in test path 700 should be control server 730 instead of microservice 523 (such as an IP or VIP address of control server 730), microservice 522 transmits request response 722 to control server 730 as shown. Likewise, because request response 713 includes a routing indicator that the next step in test path 700 should be failure injection server 740 instead of microservice 523, microservice 522 transmits request response 723 to failure injection server 740.

The above-described logic for transmitting request response 721 to microservice 523, request response 722 to control server 730, and request response 723 to failure injection server 740 may be implemented using any technically feasible approach known in the art. For example, in embodiments in which microservices 522-524 communicate via an RPC protocol, microservices 522-524 each include an injection point for input and output that enable microservices 522-524 to each divert a selected portion of request traffic 710 to a suitable control server or failure injection server. One such embodiment is illustrated in FIG. 8.

Figure 8:
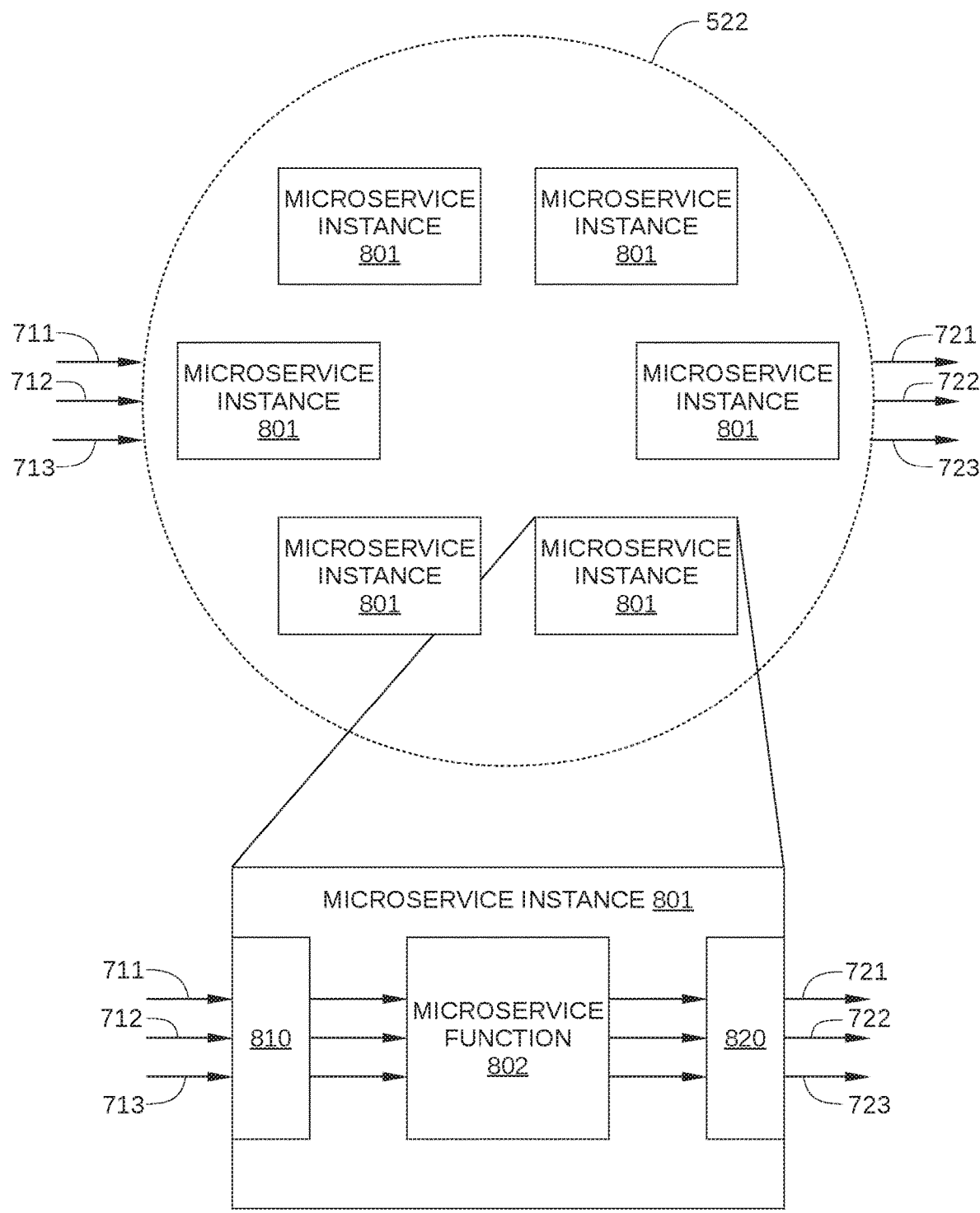
FIG. 8 schematically illustrates how a microservice can be configured to implement the test path of FIG. 7, according to various embodiments of the invention.

FIG. 8 schematically illustrates how a microservice can be configured to implement test path 700, according to various embodiments of the invention. Microservice 522 includes a plurality of microservice instances 801 that are generally configured to be identical to each other. Thus, when microservice 522 receives request response 711, 712, or 713, any one of microservice instances 801 can perform the microservice associated with microservice 522. Each microservice instance 801 may be implemented as an instance of a microservice that is running on a physical computing system, such as a computing device in a data center, or on a virtual computing instance executing within a computing cloud. As shown, each microservice instance 801 includes a microservice function 802, an input injection point 810, and an output injection point 820.

Microservice function 802 includes the functions of the microservice associated with microservice 522, including generating request responses 721, 722, and 723. Input injection point 810 includes logic for receiving request responses 711, 712, and 713, and output injection point 820 includes logic for appropriately routing request responses 721, 722, and 723.

In some embodiments, output injection point 820 is configured to route request response 721 based on a tag, metadata, or some other routing indicator included in request response 701, route request response 722 based on a routing indicator included in request response 702, and route request response 723 based on a routing indicator included in request response 703. In such embodiments, the interprocess communication logic of output injection point 820 can be configurable. For example, logic included in output injection point 820 may be updatable with new rules provided by a different service within network infrastructure 100. In alternative embodiments, microservice instance 801 includes an agent installed thereon to perform the routing functions of output injection point 820. In such embodiments, routing of response requests may be based on values in an IP table or the like.

In some embodiments, input injection point 810 includes filtering logic configured to identify a request that includes a routing indicator for a failure injection server and to retrieve instructions when such a routing indicator is detected. In such embodiments, when the criteria included in the filtering logic are met, microservice instance 801 can retrieve instructions that enable the injection of a failure, fault, or other error into the operation of that particular microservice instance 801. For example, one such criterion may be that a received request includes a routing indicator associated with a specific failure injection server 740, i.e., the received request is request response 723. Another such criterion may be that microservice instance 801 has a VIP associated with that same failure injection server 740. Thus when such criteria are determined by the filtering logic of input injection point 810 to be satisfied, microservice instance 801 retrieves instructions for injecting a particular failure, fault, or other error into the operation of that particular microservice instance 801. Injection of a failure, fault, or other error is described below.

Returning to FIG. 7, microservice 523 is configured to receive requests from a client, such as microservice 522, perform a certain service, and transmit data and/or additional requests accordingly. Thus, in the embodiment of test path 700 illustrated in FIG. 7, microservice 523 receives request response 721, performs a service referenced in request response 721, and transmits request response 731 to microservice 524.

Control server 730 and failure injection server 740 are each configured as a different instance of a particular microservice included in test path 700. For example, in the embodiment illustrated in FIG. 7, control server 730 and failure injection server 740 are instances of microservice 523. In other embodiments, control server 730 and failure injection server 740 are each configured as an instance of microservice 522, microservice 524, or any other microservice associated with test path 700. In some embodiments, control server 730 and/or failure injection server 740 may each be implemented as an instance of a microservice that is running on a physical computing system, such as a computing device in a data center. Alternatively, control server 730 and/or failure injection server 740 may each be implemented as an instance of a microservice that is running on a virtual computing instance executing within a computing cloud.

In some embodiments, control server 730 and failure injection server 740 are configured to include substantially the same functionality as the one or more instances of microservice 523 included in test path 700, with one difference. That is, control server 730 and failure injection server 740 may be identical instances of microservice 523, except that control server 730 and failure injection server 740 are each uniquely identified from microservice 523. Unlike the one or more other instances of microservice 523 in test path 700, control server 730 and failure injection server 740 are each configured with an IP address, a VIP address, or some other unique identifier or routing indicator that is different from the unique identifier that is associated with microservice 523. Therefore, RPC messages, e.g., request response 722 and 723, can be directed by output injection point 820 of microservice 522 to control server 730 and failure injection server 740 rather than to microservice 523. Thus, while control server 730 and failure injection server 740 each include the functionality of an instance of microservice 523, control server 730 and failure injection server 740 each function as a different remote service or application from microservice 523.

As noted above, in some embodiments, failure injection server 740 and microservice 523 are identical instances of the microservice to be tested, which is microservice 523 in FIG. 7. Thus, via filtering logic in an input injection point 810, failure injection server 740 is configured to inject a specified failure, fault, or error into a selected portion of request traffic 710 when certain criteria are met. Specifically, when input injection point 810 of failure injection server 740 receives a request response that includes a routing indicator for failure injection server 740, logic included in input injection point 810 determines that a specified failure, fault, or error is to be executed as part of executing the functionality of microservice 523. Thus, in the embodiment illustrated in FIG. 7, failure injection server 740 is configured to generate a specified failure, fault, or error, represented by error response 733, whenever request response 723 is transmitted to failure injection server 740. Suitable failures, faults, or errors that may be generated by failure injection server 740 include: returning no data to a requesting microservice; failing to take any action; pause for a specified time interval before responding to request response 723 (to introduce an unexpected delay into test path 700), etc. As a result, microservice 524 may or may not receive an expected response from failure injection server 740 when error response 733 is received, depending on whether failure injection server 740 successfully implements correct fallback behavior in response to the injected failure.

When the microservice to be tested, i.e., microservice 523, correctly implements fallback behavior, error response 733 includes alternate data sufficient to enable downstream microservices in test path 700 to perform effectively. For example, rather than returning user-specific data from a particular database, error response 733 may instead include generic data, or user data that has been recently cached. Thus, when the particular database is rendered unavailable by the error injected by failure injection server 740, microservice 524 and any other downstream microservices in test path 700 can still perform normally.

Microservice 524 is configured to receive requests from a client service, such as microservice 523, control server 730, or failure injection server 740, and to perform a specified service. Because microservice 524 is the last microservice of test path 700, microservice 524 is further configured to transmit a suitable request response to the appropriate client. Thus, in the embodiment illustrated in FIG. 7, microservice 524 receives request response 731 from microservice 523, performs the specified service, and transmits request response 741 to the client (not shown) that generated the data request 701 associated with request responses 711, 721, and 731. Similarly, microservice 524 receives request response 732 from control server 730, performs the specified service, and transmits request response 742 to the client (not shown) that generated data request 702. Further, microservice 524 receives error response 733 from failure injection server 740, attempts to perform the appropriate fallback behavior in light of the fault or error represented by error response 733, and transmits request response 743 to the client (not shown) that generated data request 703.

It is noted that control server 730 includes the functionality of microservice 523. Therefore, because the same quantity of request traffic is directed to control server 730 and to failure injection server 740, the fallback behavior of microservice 523 can be directly tested, even though interactions between the many microservices services of network infrastructure 100 can cause unpredictable outcomes in the live traffic employed for such testing. For example, a success rate of request response 742 reaching a client can be compared to a success rate of request response 743 reaching a client. When microservice 523 successfully implements suitable fallback behavior in response to an error (i.e., error response 733), the success rate of request response 743 should be substantially the same as the success rate of request response 742. When microservice 523 does not successfully implement suitable fallback behavior and/or responds to the error response 733 with an unexpected delay or some other additional error, the success rate of request response 743 should be substantially less than the success rate of request response 742, and in many cases is equal to zero. Furthermore, when test path 700 includes additional downstream microservices, i.e., microservices that are affected by the output of microservice 524, the effect of the error or fault represented by error response 733 on the overall performance of test path 700 can be quantified. Thus, the overall behavior of test path 700 can be quantified, using live request traffic, when a specified specified failure, fault, or error is injected at failure injection server 740.

Figure 9:
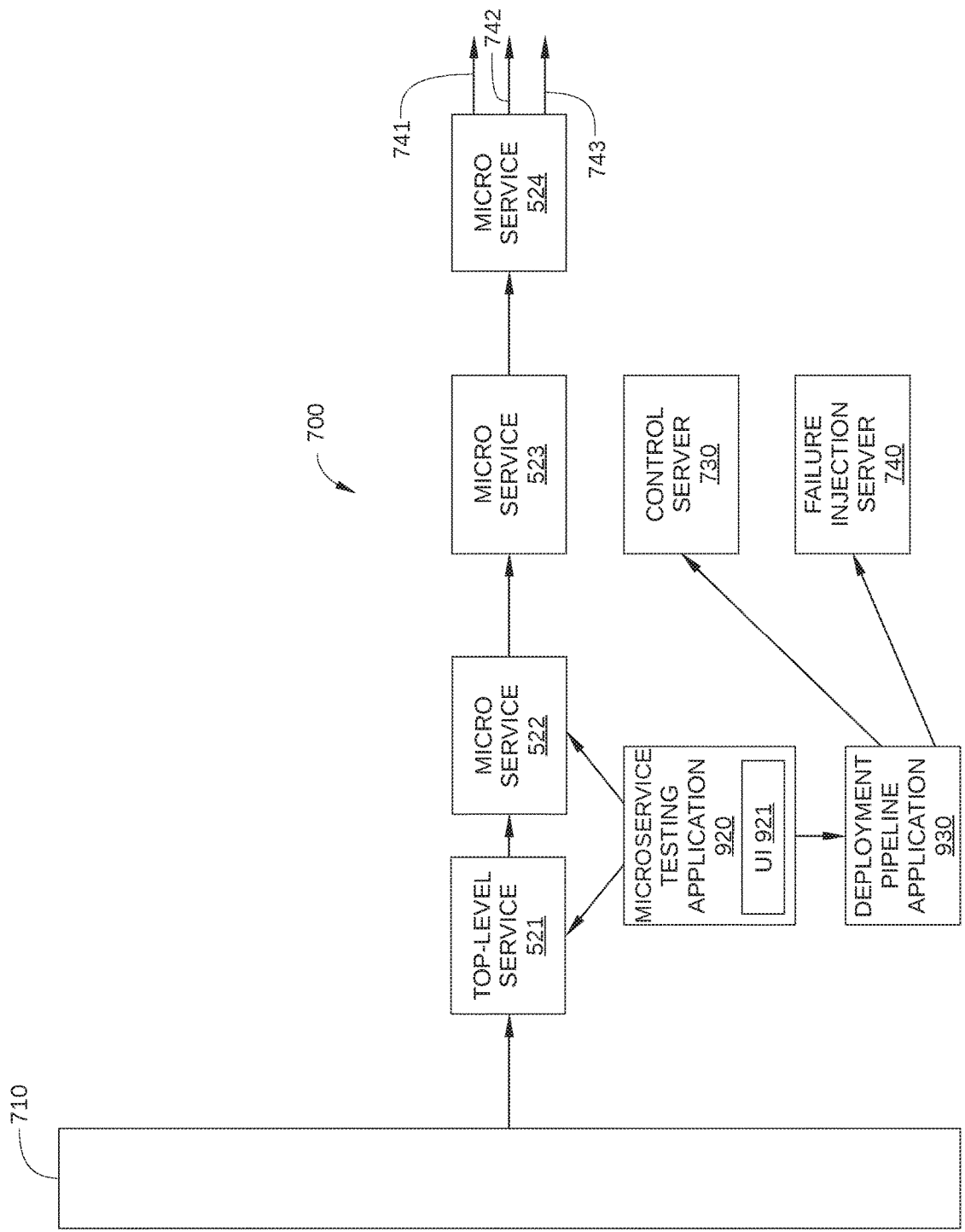
FIG. 9 is a schematic illustration of a microservice testing application implementing an instance of microservice testing in the request path of FIG. 7, according to various embodiments of the invention.

FIG. 9 is a schematic illustration of a microservice testing application 920 implementing an instance of microservice testing in test path 700, according to various embodiments of the invention. Microservice testing application 920 is configured to set-up and monitor one or more instances of microservice testing in test path 700. To facilitate implementation of a specific instance of microservice testing in test path 700, microservice testing application 920 includes a user interface 921.

In operation, microservice testing application 920 receives inputs from user interface 921. The inputs may indicate one or more of where in response path 700 a fault is to be injected, what fault is to be injected, and what is the duration of the microservice testing. In response to the inputs, microservice testing application 920 provisions a suitable control server 730 and failure injection server 740. For example, in some embodiments, microservice testing application 920 sends a request to a deployment pipeline application 930 or other service configured to instantiate the various microservices of response path 700 and provide computing resources therefor. In addition, microservice testing application 920 updates logic in top-level service 521 so that a specific portion of request traffic 710 is directed to control server 730 and to failure injection server 740 instead of to microservice 523. For example, microservice testing application 920 may instruct top-level service 521 to modify headers of a certain fraction of request traffic 710 to include an IP address, a VIP address, or some other unique identifier that is different from the unique identifier that is associated with microservice 523. In addition, microservice testing application 920 updates routing logic in microservice 522 so that request traffic with such modified headers is appropriately directed to control server 730 and failure injection server 740 instead of to microservice 523. Further, microservice testing application 920 updates logic in failure injection server 740, for example at an input injection point 810, so that failure injection server 740 causes causing one or more errors to trigger in failure injection server 740 when failure injection server 740 receives a request response from microservice 522. Further, microservice testing application 920 monitors request responses 742 and 743, and determines a success rate associated with each. Thus, microservice testing application 920 can determine a failure resilience status of microservice 523.

In some embodiments, microservice testing application 920 is implemented as a service that is running on a physical computing system, such as a computing device in a data center, or on a virtual computing instance executing within a computing cloud. In some embodiments, microservice testing application 920 may be instantiated in one or more of content servers 110, control servers 120, and/or cloud services 130 of FIG. 1, or on a stand-alone computing device. One such computing device is described below in conjunction with FIG. 10.

Figure 10:
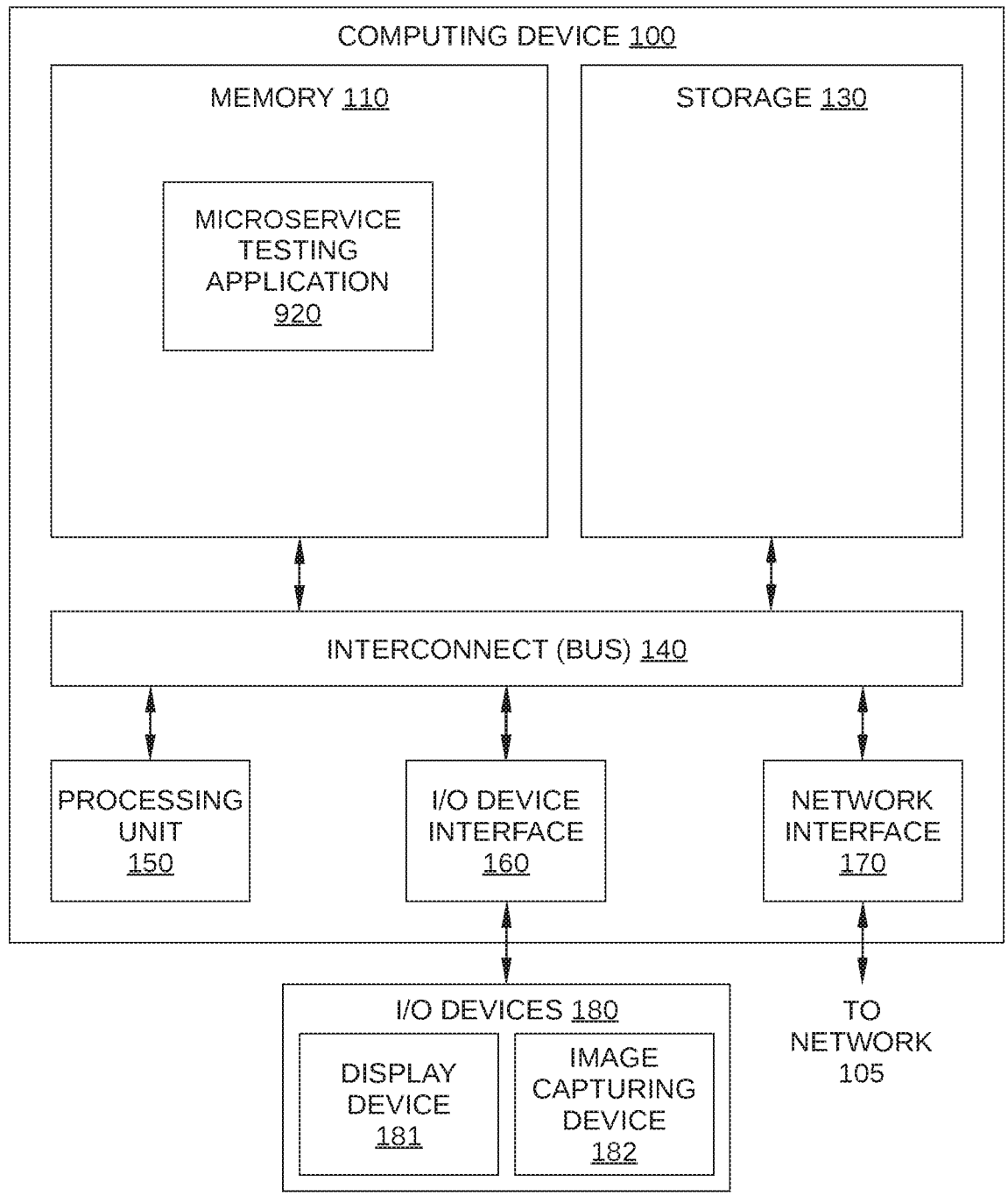
FIG. 10 is an illustration of a computing device configured to implement various embodiments of the present invention.

FIG. 10 is an illustration of a computing device 1000 configured to implement various embodiments of the present invention. In operation, computing device 1000 is configured to implement and monitor an instance of microservice testing in test path 700, by executing microservice testing application 920, according to one or more embodiments of the present invention.

Computing device 1000 may be any type of device capable of executing application programs including, without limitation, instructions associated with microservice testing application 920. For example, and without limitation, computing device 1000 may be a laptop, a tablet, a smartphone, etc. In the embodiment illustrated in FIG. 10, computing device 1000 includes, without limitation, a processor 1010, input/output (I/O) devices 1020, and a memory 1030.

Processor 1010 may be implemented as a central processing unit (CPU), a graphics processing unit (GPU), an ASIC, an FPGA, any other type of processing unit, or a combination of different processing units. Among other things, and without limitation, processor 1010 may be any technically feasible hardware unit capable of processing data and/or executing software applications to facilitate execution of microservice testing application 920, as described herein.

I/O devices 1020 may include input devices, output devices, and devices capable of both receiving input (e.g., digital images and text-containing images to be incorporated into the digital images) and providing output (e.g., digital images in which one or more text-containing images have been incorporated). Memory 1030 may include a memory module or a collection of memory modules. As shown, in some embodiments, some or all of microservice testing application 920 may reside in memory 1030 during operation.

Computing device 1000 may be implemented as a stand-alone chip, such as a microprocessor, or as part of a more comprehensive solution that is implemented as an application-specific integrated circuit (ASIC), a system-on-a-chip (SoC), and so forth. Generally, computing device 1000 may be configured to coordinate the overall operation of a computer-based system. In other embodiments, computing device 1000 may be coupled to, but separate from such a computer-based system. In such embodiments, the computer-based system may include a separate processor that transmits input to computing device 1000, and receives output from computing device 1000. However, the embodiments disclosed herein contemplate any technically feasible system configured to implement microservice testing application 920.

In alternative embodiments, rather than being configured as a stand-alone machine, computing device 1000 may be associated with or included in one or more of content servers 110 and/or control servers 120 in FIG. 1. For example, and without limitation, the functionality of computing device 1000 may be incorporated into or implemented by the various processors included within content server 110, shown in FIG. 2 and/or any server or other machine within cloud services 130 in FIG. 1. In such embodiments, microservice testing application 920 may reside in one or more of content servers 110 and/or control servers 120 during operation.

Microservice Testing in a Highly-Scaled Computing Environment

Figure 11:
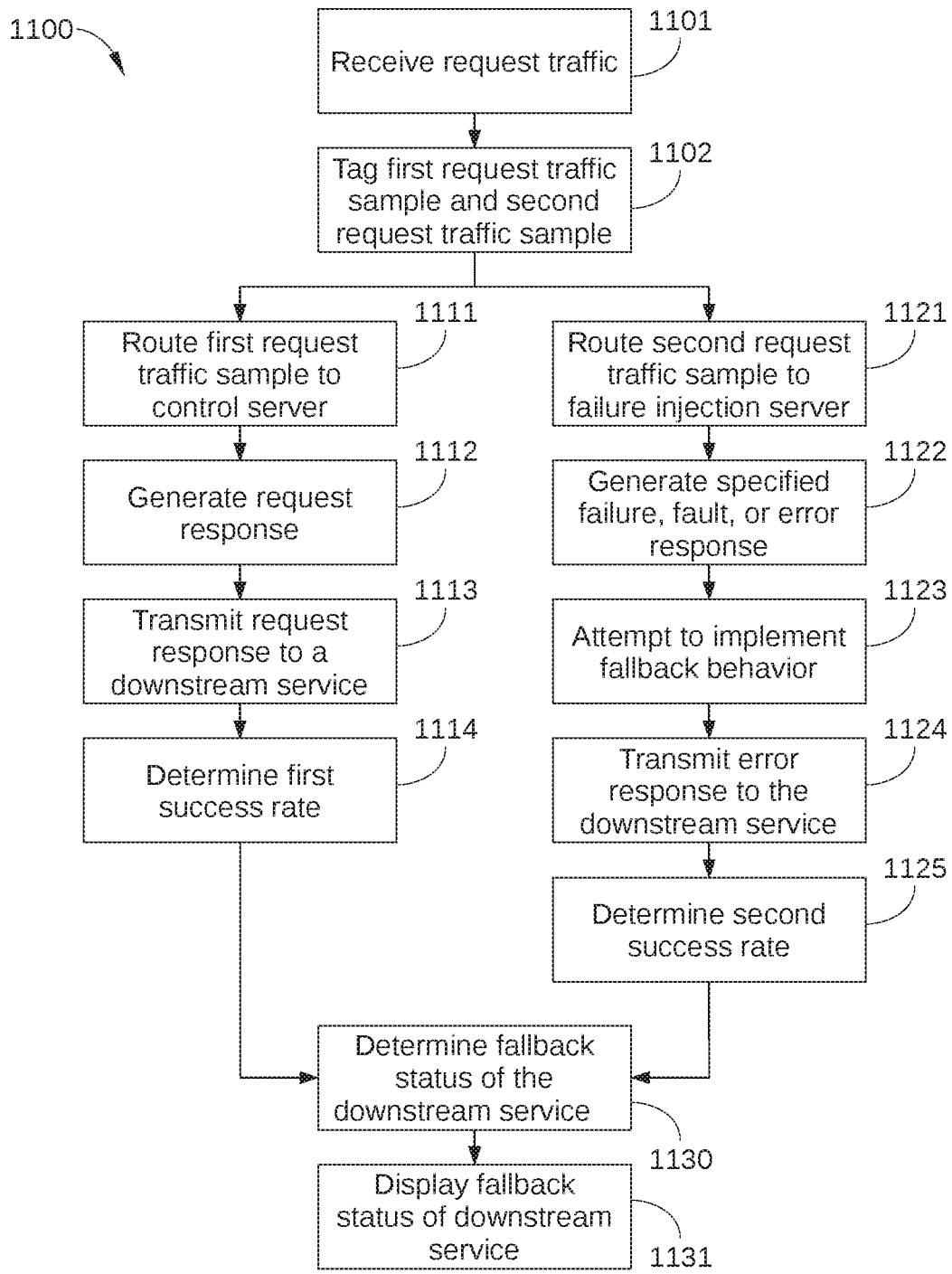
FIG. 11 sets forth a flowchart of method steps for testing microservices in a distributed computing system, according to various embodiments of the present invention.

FIG. 11 sets forth a flowchart of method steps for testing microservices in a distributed computing system, according to various embodiments of the present invention. Although the method steps are described with respect to the systems of FIGS. 1-10, persons skilled in the art will understand that any system configured to perform the method steps, in any order, falls within the scope of the present invention.

As shown, a method 1100 begins at step 1101, in which top-level service 521 receives request traffic 710 from a plurality of clients. In step 1102, top-level service 521 tags or otherwise modifies a first request traffic sample, such as the portion of request traffic 710 represented by data request 702. Top-level service 521 also tags or otherwise modifies a second request traffic sample, such as the portion of request traffic 710 represented by data request 703. Thus, a portion of request traffic 710 is tagged to be routed to test path 700, i.e., through control server 730 and failure injection server 740, rather than through request path 500.

In some embodiments, the number of data requests in the first request traffic sample is equal to or substantially equal to the number of data requests in the second request traffic sample. As a result, a difference in the performance of the first request traffic sample and the second request traffic sample can generally be assumed to be caused by failures injected into the request path traversed by the second request traffic sample. Accordingly, a comparison of the performance of the first request traffic sample and the second request traffic sample can provide a strong signal without affecting a large portion of request traffic 710. Thus, in some embodiments, the portion of request traffic 710 chosen to be in the first request traffic sample and the second request traffic sample may be a very small fraction of the overall number of data requests included in request traffic 710, for example on the order of 0.1%. It is noted that because only a small portion of request traffic 710 is diverted to the first request traffic sample and the second request traffic sample, many other microservice tests may be performed in parallel without confounding results.

In step 1111, a microservice in test path 700 routes the first request traffic sample to control server 730. For example, the microservice may route the first request traffic sample to control server 730 based on routing logic in an output injection point 820 included in the microservice. In step 1112, control server 730 performs the requested service and generates an appropriate response request. In step 1113, control server 730 transmits the request response to a downstream microservice. For example, the downstream microservice can be the microservice that routed the request response to control server 730, or any other appropriate microservice. The downstream microservice then performs the appropriate service, the remaining microservices to be traversed in test path 700 operate normally, and response request 741 is returned to the appropriate client. In step 1114, microservice testing application 920 determines a success rate associated with the first request traffic sample. For example, in embodiments in which network infrastructure 100 is a content streaming service, a rate of streams per second may be computed in step 1114 to determine a performance of test path 700 when no fault or error is injected therein. Alternatively or additionally, the success rate associated with the first request traffic sample may be based on the behavior or performance of other downstream microservices in test path 700. Method 1100 then proceeds to step 1130.

In step 1121, a microservice in test path 700 routes the second request traffic sample to failure injection server 740. For example, the microservice may route the second request traffic sample to failure injection server 740 based on routing logic in an output injection point 820 included in the microservice. In step 1122, failure injection server 740 generates or executes a specified failure, fault, or error, or causes the specified failure, fault, or error to trigger in failure injection server 740. For example, failure injection server 740 pauses for a specified time interval before responding to request response 723, thereby introducing an unexpected delay into test path 700. Alternatively or additionally, failure injection server 740 does not fetch requested data, or returns no data, or takes no action.

In step 1123, failure injection server 740 microservice attempts to implement suitable fallback behavior in response to the failure, fault, or error executed by failure injection microservice 740. For example, failure injection microservice 740 may fetch generic data or previously cached user data in lieu of the most up-to-date user data. When failure injection server 740, or any other downstream microservice, does not successfully implement appropriate fallback behavior, the performance of test path 700 is degraded. For example, response request 743 may not be returned to the client at all, or response request 743 may be returned to the client with unwanted latency or incorrect or corrupted data.

In step 1124, failure injection server 740 transmits error response 733 to an appropriate downstream microservice in test path 700, where error response 733 may include a delayed response, unexpected data, or no response at all, i.e., failure injection server 740 takes no action in response to receiving request response 723. As noted previously, when the microservice to be tested, i.e., microservice 523, correctly implements fallback behavior, error response 733 includes alternate data sufficient to enable downstream microservices in test path 700 to perform effectively. In step 1125, microservice testing application 920 determines a success rate associated with the second request traffic sample. Method 1100 then proceeds to step 1130.

In step 1130, microservice testing application 920 determines a fallback status of the downstream microservice, i.e., an ability for the downstream microservice to implement appropriate fallback behavior when a particular fault is encountered. In some embodiments, the fallback status is based on a comparison of the success rate of the first request traffic sample and the success rate of the second request traffic sample, where the success rate of the first request traffic sample is considered a control. For example, when the success rate of the second request traffic sample is less than a specified fraction of the control, the downstream microservice may be considered to have inadequate fallback behavior. In step 1131, microservice testing application 920 causes the fallback status of the downstream microservice to be displayed, for example via user interface 921. Alternatively or additionally, microservice testing application 920 may also cause any other suitable performance metrics of the first request traffic sample and the second request traffic sample to be displayed.

One suitable performance metric on which the failure resiliency of microservice 523 can be based includes an absolute number of data requests 702 and 703 that are successfully fulfilled, via test path 700, by control server 730 and failure injection server 740. Specifically, when data requests 703 are fulfilled at a rate that is substantially equal to a rate at which data requests 702 are fulfilled, microservice 523 clearly implements correct fallback behavior in response to the failure injected at failure injection server 740. When data requests 703 are fulfilled at a rate that is measurably less than the rate at which data requests 702 are fulfilled, a predetermined minimum threshold value may be employed to define whether microservice 523 is sufficiently resilient with respect to a particular error injected at failure injection server 740. For example, when data requests 703 are fulfilled at a rate that is, for example, 75% or less than the rate at which data requests 702 are fulfilled, microservice 523 may be defined as insufficiently robust in the face of that particular failure.

Alternatively or additionally, another suitable performance metric on which the failure resiliency of microservice 523 can be based may be a duration of time required for data requests 702 to be fulfilled versus a duration of time required for data requests 702 to be fulfilled. Yet another such performance metric may be a number of failed requests associated with data requests 703 versus a number of failed requests associated with data requests 703. Furthermore, any other performance metrics associated with the completion of data requests 702 and the completion of data requests 703 may be employed in step 1130.

In sum, weaknesses with respect to a particular microservice are detected in a distributed computing system by observing the behavior of the distributed system during a controlled experiment. In the controlled experiment, a fraction of normal request traffic is diverted to the microservice of interest, and failures are injected into half of the diverted traffic. Overall behavior of the distributed system is then monitored with respect to the diverted traffic to quantify effects of the injected failures.

At least one advantage of the disclosed techniques is that interactions between the many individual services in a distributed computing system can be tested in a controlled and systematic way, thereby reducing the systemic uncertainty in the distributed computing system. A further advantage is that a plurality of such tests can be performed in parallel in the distributed computing system without affecting the results of other tests.

1. In some embodiments, a method comprises: routing a first traffic sample associated with request traffic from one or more client devices to a first instance of a first service included in a sequence of services implemented in a distributed computing system, wherein the first instance generates a first plurality of request responses in response to a first plurality of data requests included in the first traffic sample and transmits the first plurality of request responses to a second service included in the sequence of services; routing a second traffic sample associated with the request traffic to a second instance of the first service, wherein the second instance generates a second plurality of request responses in response to a second plurality of data requests included in the second traffic sample and transmits the second plurality of request responses to the second service; computing a first success rate for the distributed computing system based on the first plurality of data requests and the first plurality of request responses; computing a second success rate for the distributed computing system based on the second plurality of data requests and the second plurality of request responses; and determining a failure resiliency status of the first service based on the first success rate and the second success rate.

2. The method of clause 1, further comprising: tagging each response request in the first plurality of request responses with a first routing indicator that references the first instance; tagging each response request in the second plurality of request responses with a second routing indicator that references the second instance; and routing the first plurality of request responses to the first instance based on the first routing indicator and routing the second plurality of request responses to the second instance based on the second routing indicator.

3. The method of clause 1, wherein routing the first plurality of data requests to the first instance of the first service is performed concurrently with routing the second plurality of data requests to the second instance of the first service.

4. The method of clause 1, further comprising: concurrently with routing the first traffic sample to the first instance of the first service, routing a third traffic sample associated with the request traffic to a first instance of a third service included in the sequence of services, wherein the first instance associated with the third service generates a third plurality of request responses in response to a third plurality of data requests included in the third traffic sample and transmits the third plurality of request responses to a fourth service included in the sequence of services; and concurrently with routing the second traffic sample to the second instance of the first service, routing a fourth traffic sample associated with the request traffic to a second instance associated with the third service, wherein the second instance associated with the third service generates a fourth plurality of request responses in response to a fourth plurality of data requests included in the fourth traffic sample and transmits the fourth plurality of request responses to the fourth service.

5. The method of clause 4, further comprising: computing a third success rate for the distributed computing system based on the third plurality of data requests and the third plurality of request responses; computing a fourth success rate for the distributed computing system based on the fourth plurality of data requests and the fourth plurality of request responses; and determining a failure resiliency status of the third service based on the third success rate and the fourth success rate 6. The method of clause 1, wherein a service preceding the first service in the sequence of services routes the first traffic sample to the first instance and routes the second traffic sample to the second instance.

7. The method of clause 1, further comprising causing one or more errors to trigger in the second instance when the second instance generates the second plurality of request responses.

8. The method of clause 1, further comprising routing a remaining portion of request traffic to the second service, wherein the remaining portion of the request traffic does not include the first traffic sample or the second traffic sample.

9. The method of clause 8, wherein the remaining portion of the request traffic includes a number of data requests that is greater than a sum of the first traffic sample and the second traffic sample.

10. The method of clause 1, wherein each of the first traffic sample and the second traffic sample comprises a same number of data requests.

11. The method of clause 1, further comprising transmitting an erroneous response after a delay interval.

12. The method of clause 1, wherein no request response is transmitted from the second instance of the first service to the second service.

13. A system, comprising: a first memory storing a text-routing application; a first processor that is coupled to the first memory and, when executing the text-routing application, is configured to: route a first traffic sample associated with request traffic from one or more client devices to a first instance of a first service included in a sequence of services implemented in a distributed computing system, wherein the first instance generates a first plurality of request responses in response to a first plurality of data requests included in the first traffic sample and transmits the first plurality of request responses to a second service included in the sequence of services; and route a second traffic sample associated with the request traffic to a second instance of the first service, wherein the second instance generates a second plurality of request responses in response to a second plurality of data requests included in the second traffic sample and transmits the second plurality of request responses to the second service; a second memory storing a microservice testing application; and a second processor that is coupled to the second memory and, when executing the microservice testing application, is configured to: compute a first success rate for the distributed computing system based on the first plurality of data requests and the first plurality of request responses; compute a second success rate for the distributed computing system based on the second plurality of data requests and the second plurality of request responses; and determine a failure resiliency status of the first service based on the first success rate and the second success rate.

14. The system of clause 13, further comprising: a third memory storing a text-routing application; a third processor that is coupled to the third memory and, when executing the text-routing application, is configured to: cause one or more errors to trigger in the second instance when the second instance generates the second plurality of request responses.

15. The system of clause 14, wherein causing the error to occur in the second instance is executed by the second instance.

16. The system of clause 14, wherein causing the one or more errors to trigger in the second instance comprises detecting a routing indicator included in each data request included in the second plurality of data requests.

17. The system of clause 14, wherein determining the failure resiliency status comprises determining that the second success rate is less than a predetermined fraction of the first success rate.

18. The system of clause 14, wherein the first success rate is based on an absolute number of data requests of the first plurality of data requests that are successfully fulfilled based at least in part on the first plurality of request responses, and the second success rate is based on an absolute number of data requests of the second plurality of data requests that are successfully fulfilled based at least in part on the second plurality of request responses.

19. In some embodiments, a non-transitory computer-readable storage medium including instructions that, when executed by a processor, cause the processor to perform the steps of: receiving inputs from a user interface; in response to the inputs, provisioning a first instance of a first service in a distributed computing system and a second instance of the first service; updating logic in a top-level service in the distributed computing system to modify a first portion of request traffic in the distributed computing system to include a first routing indicator that references the first instance and a second portion of request traffic in the distributed computing system to include a second routing indicator that references the second instance; updating logic in a second service in the distributed computing system so that request traffic that includes the first routing indicator is directed to the first instance and request traffic that includes the second routing indicator is directed to the second instance; updating logic in the second instance so that the second instance causes one or more errors to trigger in the second instance when the second instance receives a request response from the second service; computing a first success rate for the distributed computing system based on the first portion being routed to the first instance and a second success rate for the distributed computing system based on the second portion being routed to the second instance; and determining a failure resiliency status of the first service based on the first success rate and the second success rate.

20. The non-transitory computer-readable storage medium of clause 19, wherein causing the one or more errors comprises causing the second instance to return no data to a requesting service, fail to take an action, or pause for a specified time interval before responding to a request response to introduce an unexpected delay.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

What is claimed is:

1. A method, comprising:
routing a first traffic sample associated with request traffic from one or more client devices to a first instance of a first service included in a sequence of services implemented in a distributed computing system, wherein the first instance generates a first plurality of request responses in response to a first plurality of data requests included in the first traffic sample and transmits the first plurality of request responses to a second service included in the sequence of services;
routing a second traffic sample associated with the request traffic to a second instance of the first service, wherein the second instance:
  determines that one or more failures are to be executed as part of executing the second instance;
  executes the one or more failures as part of executing the second instance;
  generates a second plurality of request responses in response to a second plurality of data requests included in the second traffic sample; and
  transmits the second plurality of request responses to the second service;
computing a first success rate for the distributed computing system based on the first plurality of data requests and the first plurality of request responses;
computing a second success rate for the distributed computing system based on the second plurality of data requests and the second plurality of request responses; and
determining a failure resiliency status of the first service based on a comparison of the first success rate and the second success rate.

2. The method of claim 1, further comprising:
tagging each data request in the first plurality of data requests with a first routing indicator that references the first instance;
tagging each data request in the second plurality of data requests with a second routing indicator that references the second instance; and
routing each data request in the first plurality of data requests to the first instance based on the first routing indicator, and routing each data request in the second plurality of data requests to the second instance based on the second routing indicator.

3. The method of claim 1, wherein routing the first plurality of data requests to the first instance of the first service is performed concurrently with routing the second plurality of data requests to the second instance of the first service.

4. The method of claim 1, further comprising:
concurrently with routing the first traffic sample to the first instance of the first service, routing a third traffic sample associated with the request traffic to a first instance of a third service included in the sequence of services, wherein the first instance associated with the third service generates a third plurality of request responses in response to a third plurality of data requests included in the third traffic sample and transmits the third plurality of request responses to a fourth service included in the sequence of services; and
concurrently with routing the second traffic sample to the second instance of the first service, routing a fourth traffic sample associated with the request traffic to a second instance associated with the third service, wherein the second instance associated with the third service generates a fourth plurality of request responses in response to a fourth plurality of data requests included in the fourth traffic sample and transmits the fourth plurality of request responses to the fourth service.

5. The method of claim 4, further comprising:
computing a third success rate for the distributed computing system based on the third plurality of data requests and the third plurality of request responses;
computing a fourth success rate for the distributed computing system based on the fourth plurality of data requests and the fourth plurality of request responses; and
determining a failure resiliency status of the third service based on the third success rate and the fourth success rate.

6. The method of claim 1, wherein a service preceding the first service in the sequence of services routes the first traffic sample to the first instance and routes the second traffic sample to the second instance.

7. The method of claim 1, further comprising causing one or more errors to trigger in the second instance when the second instance generates the second plurality of request responses.

8. The method of claim 1, further comprising routing a remaining portion of request traffic to the second service, wherein the remaining portion of the request traffic does not include the first traffic sample or the second traffic sample.

9. The method of claim 8, wherein the remaining portion of the request traffic includes a number of data requests that is greater than a sum of the first traffic sample and the second traffic sample.

10. The method of claim 1, wherein each of the first traffic sample and the second traffic sample comprises a same number of data requests.

11. The method of claim 1, further comprising transmitting an erroneous response after a delay interval.

12. The method of claim 1, wherein executing the one or more failures comprises causing the second instance to return no data to a requesting service, fail to take an action, or pause for a specified time interval before responding to a request response to introduce an unexpected delay.

13. A system, comprising:
a first memory storing a text-routing application;
a first processor that is coupled to the first memory and, when executing the text-routing application, is configured to:
route a first traffic sample associated with request traffic from one or more client devices to a first instance of a first service included in a sequence of services implemented in a distributed computing system, wherein the first instance generates a first plurality of request responses in response to a first plurality of data requests included in the first traffic sample and transmits the first plurality of request responses to a second service included in the sequence of services; and
route a second traffic sample associated with the request traffic to a second instance of the first service, wherein the second instance:
determines that one or more failures are to be executed as part of executing the second instance;
executes the one or more failures as part of executing the second instance;
generates a second plurality of request responses in response to a second plurality of data requests included in the second traffic sample; and
transmits the second plurality of request responses to the second service;
a second memory storing a microservice testing application; and
a second processor that is coupled to the second memory and, when executing the microservice testing application, is configured to:
compute a first success rate for the distributed computing system based on the first plurality of data requests and the first plurality of request responses;
compute a second success rate for the distributed computing system based on the second plurality of data requests and the second plurality of request responses; and
determine a failure resiliency status of the first service based on a comparison of the first success rate and the second success rate.

14. The system of claim 13, further comprising:
a third memory storing a text-routing application;
a third processor that is coupled to the third memory and, when executing the text-routing application, is configured to:
cause one or more errors to trigger in the second instance when the second instance generates the second plurality of request responses.

15. The system of claim 14, wherein causing the error to occur in the second instance is executed by the second instance.

16. The system of claim 14, wherein causing the one or more errors to trigger in the second instance comprises detecting a routing indicator included in each data request included in the second plurality of data requests.

17. The system of claim 14, wherein determining the failure resiliency status comprises determining that the second success rate is less than a predetermined fraction of the first success rate.

18. The system of claim 14, wherein the first success rate is based on a number of data requests of the first plurality of data requests that are successfully fulfilled based at least in part on the first plurality of request responses, and the second success rate is based on a number of data requests of the second plurality of data requests that are successfully fulfilled based at least in part on the second plurality of request responses.

19. One or more non-transitory computer-readable storage media including instructions that, when executed by one or more processors, cause the one or more processors to perform the steps of:
receiving inputs from a user interface;
in response to the inputs, provisioning a first instance of a first service in a distributed computing system and a second instance of the first service;

updating logic in a top-level service in the distributed computing system to modify a first portion of request traffic in the distributed computing system to include a first routing indicator that references the first instance and a second portion of request traffic in the distributed computing system to include a second routing indicator that references the second instance;

updating logic in a second service in the distributed computing system so that request traffic that includes the first routing indicator is directed to the first instance and request traffic that includes the second routing indicator is directed to the second instance;

updating logic in the second instance so that the second instance:

determines that one or more failures are to be executed as part of executing the second instance; and executes the one or more failures as part of executing the second instance when the second instance receives a request response from the second service;

computing a first success rate for the distributed computing system based on the first portion being routed to the first instance and a second success rate for the distributed computing system based on the second portion being routed to the second instance; and determining a failure resiliency status of the first service based on a comparison of the first success rate and the second success rate.

20. The one or more non-transitory computer-readable storage media of claim 19, wherein executing the one or more failures comprises causing the second instance to return no data to a requesting service, fail to take an action, or pause for a specified time interval before responding to a request response to introduce an unexpected delay.

\* \* \* \* \*